United States Patent
Friedman

(10) Patent No.: US 7,917,007 B2
(45) Date of Patent: Mar. 29, 2011

(54) AUTOMATIC TRACK GENERATION

(75) Inventor: Andrew Friedman, Rose Bay (AU)

(73) Assignee: Canon Information Systems Research Australia Pty Ltd, North Ryde (AU)

( * ) Notice: Subject to any disclaimer, the term of this patent is extended or adjusted under 35 U.S.C. 154(b) by 1312 days.

(21) Appl. No.: 10/803,987

(22) Filed: Mar. 19, 2004

(65) Prior Publication Data

US 2004/0243637 A1    Dec. 2, 2004

(30) Foreign Application Priority Data

Mar. 21, 2003    (AU) ................. 2003901314

(51) Int. Cl.
*G11B 27/00*    (2006.01)
(52) U.S. Cl. ......................................... 386/281
(58) Field of Classification Search ............ 386/52, 386/55
See application file for complete search history.

(56) References Cited

U.S. PATENT DOCUMENTS

| | | | |
|---|---|---|---|
| 5,801,685 A * | 9/1998 | Miller et al. | 715/202 |
| 6,185,538 B1 | 2/2001 | Schulz | 704/278 |
| 6,870,639 B2 * | 3/2005 | Ohshita | 358/1.9 |
| 6,970,639 B1 * | 11/2005 | McGrath et al. | 386/52 |
| 2003/0002851 A1 * | 1/2003 | Hsiao et al. | 386/52 |
| 2003/0026592 A1 * | 2/2003 | Kawahara et al. | 386/52 |

OTHER PUBLICATIONS

Jonathan Foote, et al., "Creating Music Videos Using Automatic Media Analysis", Multimedia '02, Dec. 1-6, 2002, Proceedings of the 10th ACM Internal Conference on Multimedia, Session 12 (2002), pp. 553-560.
Aug. 8, 2006 Australian Official Action in Australian Patent Appln. No. 2004201185.
Roxio—VideoWave Movie Creator 1.1, Digital Video Software Gallery.

* cited by examiner

*Primary Examiner* — Peter-Anthony Pappas
*Assistant Examiner* — Asher Khan
(74) *Attorney, Agent, or Firm* — Fitzpatrick, Cella, Harper & Scinto

(57) ABSTRACT

A method of generating a dependent media item (911) is disclosed. The method comprises arranging a sequence of EDL elements (901-907) in an order, wherein at least an ordered sub-set of the EDL elements (901-907) are associated with track control attributes (912) for the dependent media item (911). The method further comprises producing a sequence of media items (904-908) in a source track (906) dependent upon at least some of the sequence EDL elements (901-907), and generating the dependent media item (911) dependent the track control attributes (912) and the order in which the sub-set of EDL elements is arranged.

11 Claims, 9 Drawing Sheets

AUTOMATIC TRACK GENERATION

FIELD OF THE INVENTION

The current invention relates to video editing and in particular to multiple track editing.

BACKGROUND

Video and audio productions often comprise multiple independent tracks. For example, a typical motion picture comprises a single video track, and two or more audio tracks. During the creation process for such productions, technicians frequently deal with more tracks than will be used in the final production. In the editing phase of the creation, editors separately edit these individual tracks to produce desired outcomes, but they remain mindful of the combined effect.

In the course of editing video and audio productions it is often important that one track stays synchronised with another. For example, the video of an actors lip movements is commonly closely synchronised with the relevant audio relating the actor's words. As time related aspects of a "source" video track relating to the actors lips are edited (deleted, inserted or moved etc.) the related (synchronised) "dependent" audio is correspondingly edited in cases where is desired to maintain this synchronised relationship.

In many computer-based non-linear editors the editing systems display a visualisation, often referred to as a timeline, of the multiple tracks being edited. This mechanism enables a user to observe a loss of synchronisation between tracks and to manually restore the relationship by editing the dependant tracks. This is however a tedious and error prone approach, since the user needs to continually adjust one or other track to take account of relative changes between the tracks.

Some systems allow synchronisation between different tracks to be maintained by 'locking' together the separate tracks. This enables the system to automatically preserve a synchronised timing relationship between the tracks. For some track types this locked type of synchronisation is, however, not desirable. Thus, for example, tracks such as background music or overlay video while dependent on a source video track, should be re-generated whenever the source track changes, rather than precisely reflecting the changes to the source track.

For example, consider the required changes to a dependent audio background music track, and a dependent audio dialog track when an associated source video track is edited. If some content is deleted between time $T_1$ and time $T_2$ from the source video track, the corresponding content needs to be deleted from the dependent dialog track. This corresponding content should not, however, be deleted between these time instants in the dependent background music track, since to do so would cause a discontinuity in the background music track. A more palatable solution is for the duration of the background music track to be shortened by $T_2-T_1$. Similarly, the dependent background music track may have its duration increased in response to content being inserted in the source video track, possibly requiring looping if the total duration of the dependent background music track is not sufficient.

Mechanisms for providing automatic synchronisation in current systems are complex, for one or more of the following reasons:

If synchronisation of a dependent track, with reference to a region of a source track, is possible at all, it is generally necessary to define both a beginning and end position of that region of the source track to which the dependent track is to be synchronised.

The aforementioned regions of the source track cannot simply be redefined while preserving properties of the generated dependent track. For example the definition of the media to be used for the generated dependent track is not preserved. In other words, the region of the source track to which the dependent track is synchronised cannot be redefined without removing the synchronisation entirely, and defining it anew. This redefinition requires the attributes of the synchronisation, including which media is to be used in the generation of the relevant portion of the dependent track, to be redefined.

Users typically need to consider how the synchronisation method is operating, and need to incorporate this factor in their editing rather than being able to focus on the key task of editing tracks.

There are also problems in integrating automatic synchronisation in systems that provide manual post-editing of automatically generated productions. Typically these systems are designed for users with limited experience of computers and/or video editing. Such users may simply desire the convenience of a system that is simple to use. In these systems, the automatic editing rules have been designed by professionals to ensure a good result, but the systems lack robust mechanisms to ensure that the intent of the professional is preserved throughout the editing process.

SUMMARY OF THE INVENTION

It is an object of the present invention to substantially overcome, or at least ameliorate, one or more disadvantages of existing arrangements.

Disclosed are arrangements which seek to address the above problems by loosely synchronizing, to a source media item, a dependent media item, so that the dependent media item is coupled to the source media item, the coupling being subject to moderation by other media items in the neighbourhood of the source media item.

According to a first aspect of the present invention, there is provided a method of generating a dependent media item, said method comprising the steps of:

arranging, in an order, a sequence of EDL elements for a corresponding sequence of media items in a source media track, wherein at least an ordered sub-set of the sequence of EDL elements are associated with track control attributes for the dependent media item; and generating the dependent media item dependent upon at least some of said track control attributes and the order in which the sub-set of EDL elements is arranged.

According to another aspect of the present invention, there is provided an apparatus for generating a dependent media item, said apparatus comprising:

an editor for (i) arranging a sequence of EDL elements in an order, wherein at least an ordered sub-set of the EDL elements are associated with track control attributes for the dependent media item, and (ii) producing a sequence of media items in a source track dependent upon at least some of the sequence EDL elements; and means for generating the dependent media item dependent upon at least some of said track control attributes and the order in which the sub-set of EDL elements is arranged.

According to another aspect of the present invention, there is provided a set of computer program modules comprising computer program code for directing a processor execute a procedure for generating a dependent media item, said method comprising the steps of:

arranging, in an order, a sequence of EDL elements for a corresponding sequence of media items in a source media track, wherein at least an ordered sub-set of the sequence of EDL elements are associated with track control attributes for the dependent media item; and generating the dependent media item dependent upon at least some of said track control attributes and the order in which the sub-set of EDL elements is arranged.

According to another aspect of the present invention, there is provided a set of computer program modules comprising computer program code for directing a processor execute a procedure for generating a dependent media item, said program comprising:

code for arranging, in an order, a sequence of EDL elements for a corresponding sequence of media items in a source media track, wherein at least an ordered sub-set of the sequence of EDL elements are associated with track control attributes for the dependent media item; and code for generating the dependent media item dependent upon at least some of said track control attributes and the order in which the sub-set of EDL elements is arranged.

According to another aspect of the present invention, there is provided a computer readable medium, having a program recorded thereon, where the program is configured to make a computer execute a procedure for generating a dependent media item, said program comprising:

code for arranging, in an order, a sequence of EDL elements for a corresponding sequence of media items in a source media track, wherein at least an ordered sub-set of the sequence of EDL elements are associated with track control attributes for the dependent media item; and code for generating the dependent media item dependent upon at least some of said track control attributes and the order in which the sub-set of EDL elements is arranged.

According to another aspect of the present invention, there is provided a media production comprising a sequence of media items in a source track and a dependent media item, the media items and the dependent media item having been formed by a method comprising the steps of:

arranging a sequence of EDL elements in an order, wherein at least an ordered sub-set of the EDL elements are associated with track control attributes for the dependent media item;

producing the sequence of media items in the source track dependent upon at least some of the sequence EDL elements; and generating the dependent media item dependent upon at least some of said track control attributes and the order in which the sub-set of EDL elements is arranged.

Other aspects of the invention are also disclosed.

BRIEF DESCRIPTION OF THE DRAWINGS

One or more embodiments of the present invention will now be described with reference to the drawings, in which.

DETAILED DESCRIPTION INCLUDING BEST MODE

Figure 1:
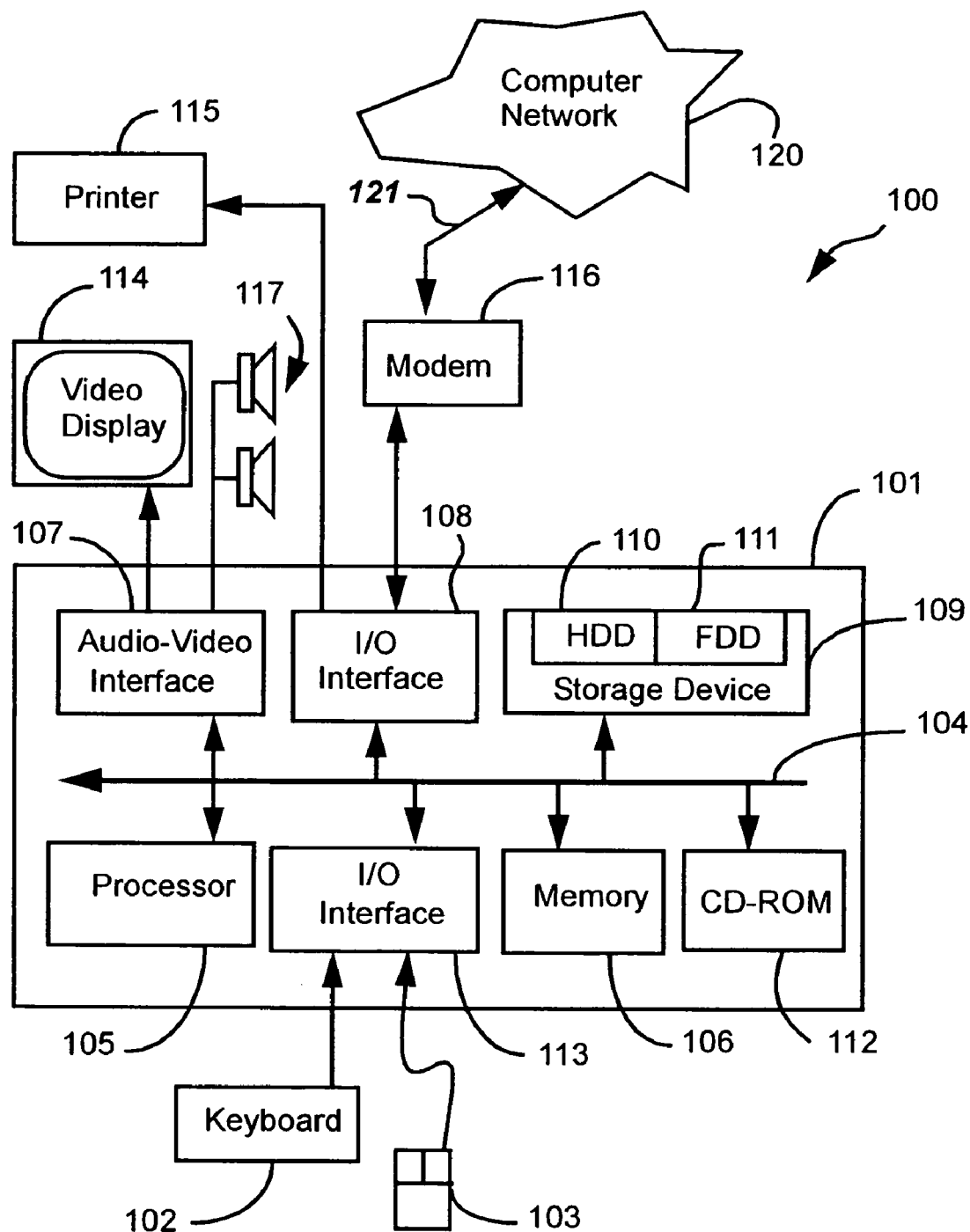
FIG. 1 is a functional block diagram of a general-purpose computer upon which the described methods for automatic track generation can be practiced.

It is to be noted that the discussions contained in the "Background" section relating to prior art arrangements relate to discussions of documents or devices which form public knowledge through their respective publication and/or use. Such should not be interpreted as a representation that such documents or devices in any way form part of the common general knowledge in the art.

Where reference is made in any one or more of the accompanying drawings to steps and/or features, which have the same reference numerals, those steps and/or features have for the purposes of this description the same function(s) or operation(s), unless the contrary intention appears.

Some portions of the description that follows are explicitly or implicitly presented in terms of algorithms and symbolic representations of operations on data within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that the above and similar terms are to be associated with the appropriate physical quantities and are merely convenient labels applied to these quantities. Unless specifically stated otherwise, and as apparent from the following, it will be appreciated that throughout the present specification, discussions utilizing terms such as "scanning", "calculating", "determining", "replacing", "generating" "initializing", "outputting", or the like, refer to the action and processes of a computer system, or similar electronic device, that manipulates and transforms data represented as physical (electronic) quantities within the registers and memories of the computer system into other data similarly represented as physical quantities within the computer system memories or registers or other such information storage, transmission or display devices.

The present specification also discloses apparatus for performing the operations of the methods. Such apparatus may be specially constructed for the required purposes, or may comprise a general purpose computer or other device selectively activated or reconfigured by a computer program stored in the computer. The algorithms and displays presented herein are not inherently related to any particular computer or other apparatus. Various general-purpose machines may be used with programs in accordance with the teachings herein. Alternatively, the construction of more specialized apparatus to perform the required method steps may be appropriate. The structure of a conventional general purpose computer will appear from the description below.

In addition, the present specification also discloses a computer readable medium comprising a computer program for performing the operations of the methods. The computer readable medium is taken herein to include any transmission medium for communicating the computer program between a source and a designated destination. The transmission medium may include storage devices such as magnetic or optical disks, memory chips, or other storage devices suitable for interfacing with a general-purpose computer. The transmission medium may also include a hard-wired medium such as exemplified in the Internet system, or wireless medium such as exemplified in the GSM mobile telephone system. The computer program is not intended to be limited to any particular programming language and implementation thereof. It will be appreciated that a variety of programming languages and coding thereof may be used to implement the teachings of the disclosure contained herein.

Figure 8:
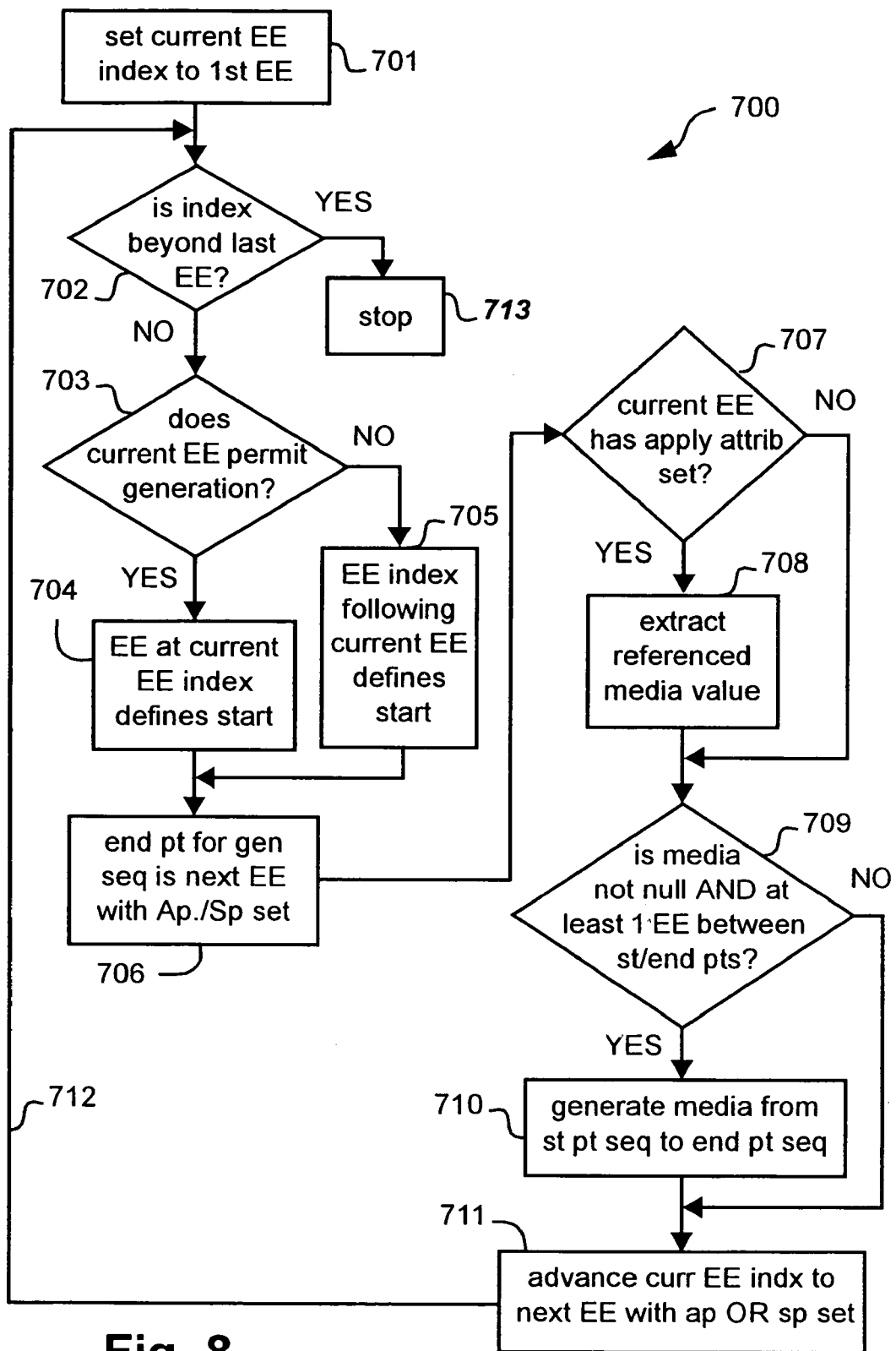
FIG. 8 shows a process for generating a dependent track from a source track.

FIG. 1 shows how the method of automatic track generation particularly lends itself to implementation on a general-purpose computer system 100, such as that shown in FIG. 1 wherein the process of FIG. 8 may be implemented as software, such as an application program executing within the computer system 100. In particular, the steps of method of automatic track generation are effected by instructions in the software that are carried out by the computer. The instructions may be formed as one or more code modules, each for performing one or more particular tasks. The software may also be divided into two separate parts, in which a first part performs the automatic track generation methods and a second part manages a user interface between the first part and the user. The software may be stored in a computer readable medium, including the storage devices described below, for example. The software is loaded into the computer from the computer readable medium, and then executed by the computer. A computer readable medium having such software or computer program recorded on it is a computer program product. The use of the computer program product in the computer preferably effects an advantageous apparatus for automatic track generation.

The computer system 100 comprises a computer module 101, input devices such as a keyboard 102 and mouse 103, output devices including a printer 115, a display device 114 and loudspeakers 117. A Modulator-Demodulator (Modem) transceiver device 116 is used by the computer module 101 for communicating to and from a communications network 120, for example connectable via a telephone line 121 or other functional medium. The modem 116 can be used to obtain access to the Internet, and other network systems, such as a Local Area Network (LAN) or a Wide Area Network (WAN), and may be incorporated into the computer module 101 in some implementations.

The computer module 101 typically includes at least one processor unit 105, and a memory unit 106, for example formed from semiconductor random access memory (RAM) and read only memory (ROM). The module 101 also includes an number of input/output (I/O) interfaces including an audio-video interface 107 that couples to the video display 114 and loudspeakers 117, an I/O interface 113 for the keyboard 102 and mouse 103 and optionally a joystick (not illustrated), and an interface 108 for the modem 116 and printer 115. In some implementations, the modem 1116 may be incorporated within the computer module 101, for example within the interface 108. A storage device 109 is provided and typically includes a hard disk drive 110 and a floppy disk drive 111. A magnetic tape drive (not illustrated) may also be used. A CD-ROM drive 112 is typically provided as a non-volatile source of data. The components 105 to 113 of the computer module 101, typically communicate via an interconnected bus 104 and in a manner that results in a conventional mode of operation of the computer system 100 known to those in the relevant art. Examples of computers on which the described arrangements can be practised include IBM-PC's and compatibles, Sun Sparcstations or like computer systems evolved therefrom.

Typically, the application program for automatic track generation, as well as the media item files associated with source and dependent media tracks, are resident on the hard disk drive 110 and read and controlled in its execution by the processor 105. Intermediate storage of the program and any data fetched from the computer memory 109 or the network 120 may be accomplished using the semiconductor memory 106, possibly in concert with the hard disk drive 110. In some instances, the application program for automatic track generation may be supplied to the user encoded on a CD-ROM or floppy disk and read via the corresponding drive 112 or 111, or alternatively may be read by the user from the network 120 via the modem device 116. Still further, the software for automatic track generation can also be loaded into the computer system 100 from other computer readable media. The term "computer readable medium" as used herein refers to any storage or transmission medium that participates in providing instructions and/or data to the computer system 100 for execution and/or processing. Examples of storage media include floppy disks, magnetic tape, CD-ROM, a hard disk drive, a ROM or integrated circuit, a magneto-optical disk, or a computer readable card such as a PCMCIA card and the like, whether or not such devices are internal or external of the computer module 101. Examples of transmission media include radio or infra-red transmission channels as well as a network connection to another computer or networked device, and the Internet or Intranets including e-mail transmissions and information recorded on Websites and the like.

The method of automatic track generation may alternatively be implemented in dedicated hardware such as one or more integrated circuits performing the functions or sub functions of automatic track generation. Such dedicated hardware may include graphic processors, digital signal processors, or one or more microprocessors and associated memories.

The disclosed arrangement for automatic track generation makes use of particular data structures to represent the relationship between media tracks. In these data structures, attributes controlling the generation of a dependent track are optionally indirectly associated with media items of a source track. A media item, when considering a video source track, typically comprises a video scene. Alternately, the media could be based upon a video frame.

Figure 2:
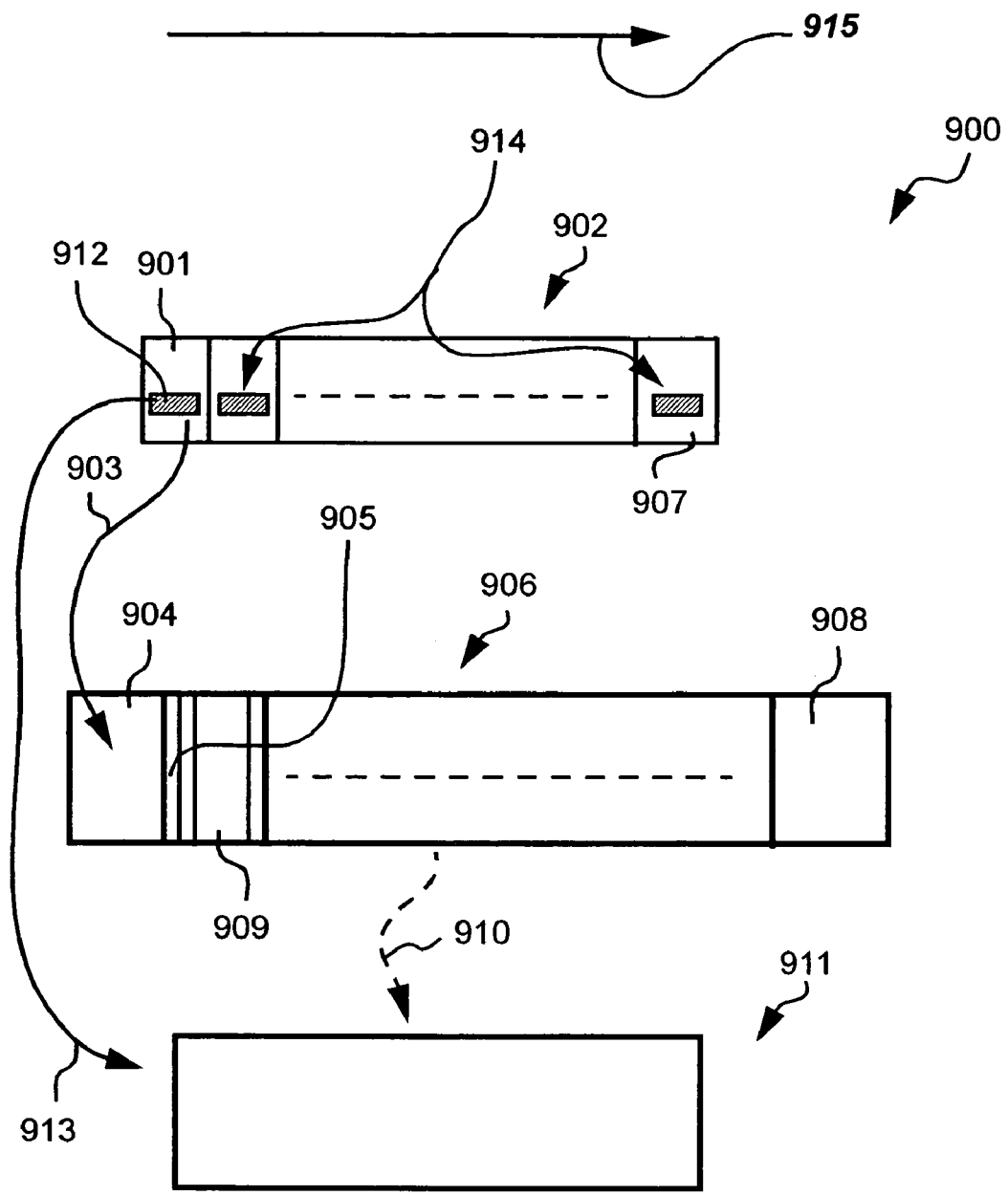
FIG. 2 shows relationships between an Edit Display List (EDL), an associated source media track, and an associated dependent media item.

FIG. 2 shows an EDL 902. The EDL 902 is composed of EDL elements 901, . . . , 907. Each EDL element 901 is associated with a media item 904 in a source media track 906. The EDL element 901 references a media item (not shown) a copy of which forms the media item 904. This media item (not shown) may be transformed in order to form the media item 904 according to attributes of the EDL element. The source media track 906 comprises a sequence of media items 904, . . . , 908. An individual media item 909 comprises video frames 905. Each media item 904 in the source media track 906 has, as depicted by an arrow 903, a corresponding EDL element 901 in the EDL 902.

An EDL (Edit Decision List) is, for the purposes of this description, a data structure that defines some or all of a audio and/or visual production. The EDL includes elements that select what, and possibly partial portions of, source media to be included in the production, and transformations to be applied to such media, including effects, temporal and spatial transformations. Additional EDL elements or attributes within these EDL elements allow sequences of media items or other EDL elements to be defined, either sequentially or overlapping in time, possibly with effects applied to their combination. These sequences are effectively source media subject to the same transformations outlined above allowing elements to be composed without limit. In regard to data structures, EDLs may be represented in many ways, including but not limited to, a formally defined language, a physical computer memory representation, or possibly, transformation of that memory representation into persistent storage (e.g. "serialisation" or "persist")

The term "media", for the purposes of this description, refers to representation(s) of images, moving or not, and/or sounds. The representation need not directly be in the fundamental forms needed for image or sound representation, so long as the representations are capable of ultimately being converted into, for example, image or sound. As such, EDLs can also be considered to be media. Media of course, needs to be located in some physical (e.g. a tape) or logical container (e.g. a computer file). To specify media it sufficient to specify its location, e.g. the location of the container, and for some containers the location within the container. This description considers the specification of the location of the media, and the media itself, to be synonymous and treats them interchangeably except where explicitly indicated to the contrary.

FIG. 2 also shows a dependent media item 911 that is "loosely synchronised", as depicted by a dashed arrow 910, with one or more of the media items 904, . . . , 908 in the source track 906. As previously noted, a source video item that is focussed on an actors lips needs to be tightly synchronised with a corresponding dependent audio item containing the actor's words. However, the dependent media item 911 in FIG. 2 is less tightly, i.e. more "loosely" coupled. This loose coupling is appropriate for dependent tracks such as a dependent background audio track that, while associated with a source video clip, does not require tight coupling as is required in the case of an actor speaking. A dependent track is typically made up of a sequence of dependent media items 911, each media item 911 being to generated by track control attributes in a corresponding sequence of EDL elements.

From an implementation perspective, the EDL element 901 is associated, as depicted by the arrow 903, with the media item 904. According to a first arrangement (also referred to as an "aggregated" arrangement as will be described with reference to FIG. 4), a sequence of the EDL elements 901, . . . , 907 contain track control attributes 912 which establish, as depicted by an arrow 913, the synchronisation between the dependent media item 911 and the source track 906.

According to the aggregated arrangement all the EDL elements in the EDL 902 have track control attributes as depicted by a reference numeral 914. These track control attributes in the EDL elements 901, . . . , 907 effect the behaviour of the dependent media item 911. In a second arrangement (also referred to as a "decoupled" arrangement as will be described with reference to FIG. 5), some of the track control attributes are incorporated into distinct EDL elements (referred to as track control elements) in the EDL of the source media track.

In the decoupled arrangement some of the track control attributes are not included within the EDL elements for the media items.

Returning to FIG. 2, the dependent media item 911 consists of media content that does not need to be closely synchronised with the source track 906. Often only the start time and duration of the dependent media item 911 need to be synchronised to the source track 906. One example of a dependent track is a video overlay track, and dependent tracks will alternately be referred to as overlays in this description. This is an example only of a dependent track, however, and dependent tracks other than overlays can also be generated using the disclosed method. Examples of source tracks include unprocessed (raw) video and dialog audio tracks. Other examples of dependent tracks are background music tracks, effect tracks and title tracks.

The track control attributes associated with the EDL elements 901, . . . , 907 comprise (a) an attribute identifying the media from which the dependent media item 911 is to be generated and (b) attributes that serve to control commencement and termination of the dependent media item 911. The track control attributes (912, . . . , 914) of the source track 906 thus control (c) when the generation of the dependent media item 911 should begin, (d) where the dependent media item 911 should end or (e) when new media should be used for a dependent media item, and (f) whether generation of the dependent media item 911 should be temporarily suspended.

One example of these track control attributes is set out in Table 1:

TABLE 1

Track Control Attribute Definitions

| Name | Type | Description |
| --- | --- | --- |
| Apply | Boolean | If this attribute is TRUE, the media referenced by the Generate Media attribute will be used from this point on, whenever it is permissible to generate a track. If the Suppress attribute is FALSE, the actual generation of the dependent track will begin from the start time of the media item that is associated with these attributes. If the Suppress attribute is TRUE, generation will not begin until a media item with the Suppress attribute set to FALSE is encountered. Generation using the referenced media continues until another media item with an Apply attribute set to TRUE is encountered, but it will be suppressed for media items with the Suppress attribute set to TRUE. |
| Suppress | Boolean | If this attribute is TRUE, generation is suppressed from the Start Time of the associated media item, for the duration of the media item. |
| Generate Media. | Media Reference | This references media to be used as a template for the media item to be generated. The generated media item will consist of a transformation of this media suitably extended or shortened to the required length. By convention, a reference to NULL or non-existent media causes track generation to be a null operation where no media is generated. |

Figure 3:
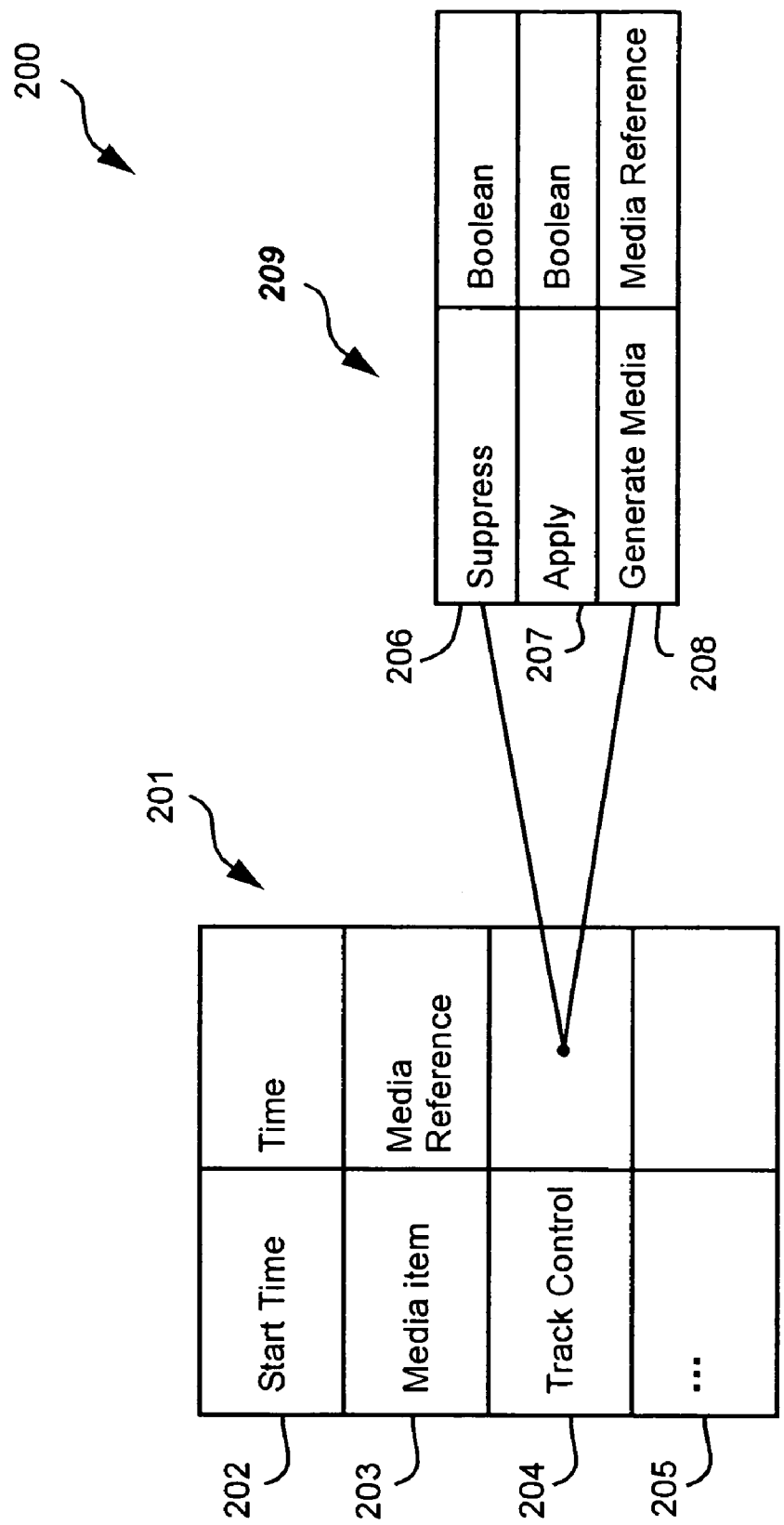
FIG. 3 shows track control attributes aggregated within an EDL element of a source media item.
Figure 4:
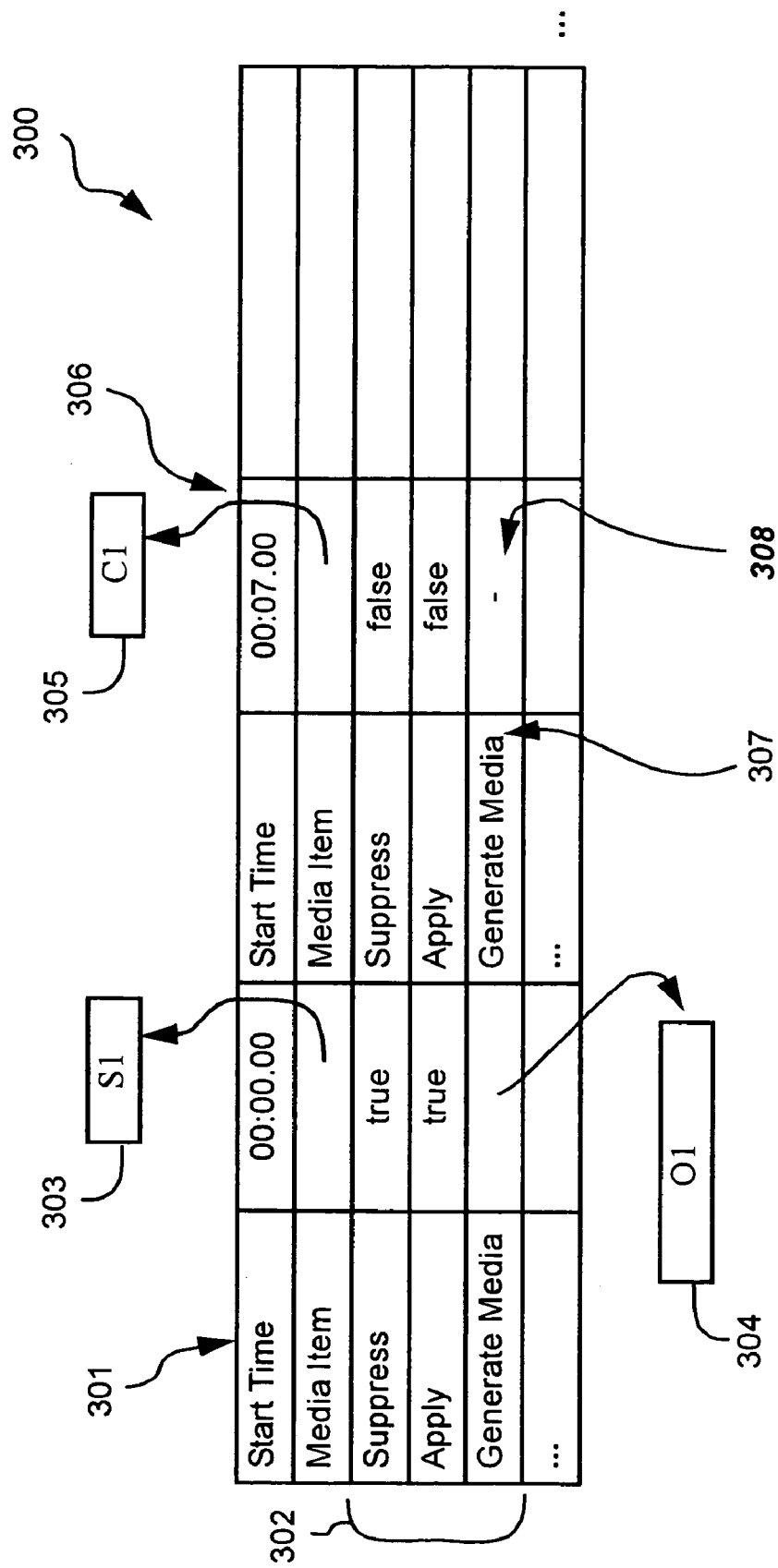
FIG. 4 shows successive EDL elements for a track, the EDL elements containing media item information and track control attributes with values shown for a number of attributes.

In the examples shown in FIGS. 3 and 4, the track control attributes conform to the aggregated approach, and form data fields within the EDL elements for the track media items. It is also noted that the track transformations referred to in the Generate Media entry in Table 1 can include trimming, looping, speeding up or slowing down video media items; omitting, selecting or duplicating still images; looping or selecting sub-sequences of audio and so on. The media used as a template for the dependent media track can be a media item or a series of media items.

FIG. 3. shows a definition of an EDL element 201 for a media item (not shown) the EDL element 201 having track control attributes 204 therein. The EDL element 201 has a data field 204 that incorporates data fields 206-208 relating to the track control attributes for a dependent media item. If the duration of the source media item associated with the EDL element 201 is zero, or no source media item is associated with the EDL element, then the EDL element is referred to as a "placeholder" since it can establish characteristics of a dependent media item without contributing anything to the source track.

FIG. 4 shows instances of two EDL elements 301 and 306 associated with the first two media items of a source track (not shown). The EDL element 301 is associated with a source media item 303 (designated as S1), and the track control attributes 302 incorporated into the EDL element 301 indicate that a dependent media item (not shown) will be loosely synchronised with the source media item 303 using a template referenced by the Generate Media attribute 304. The EDL element 306 is associated with a source media item 305 (designated as C1), but does not generate a dependent media item, because the Generate Media field 307 is NULL as indicated by a reference numeral 308.

According to the first or aggregated arrangement used in FIGS. 3 and 4, all EDL elements for a source media track incorporate track control attribute fields. However, not all these fields need play a part in generating, suppressing or modifying dependent tracks, this being determined by the value of their respective track control attributes as defined in Table 1. EDL elements which play some active role are depicted pictorially as S1, . . . , SI (see for example 303 in FIG. 4). EDL elements which play no active role are depicted pictorially as C1, . . . , CJ (see for example 305 in FIG. 4).

The aggregated method of association depicted in FIGS. 3 and 4 allows track control attributes to remain associated with EDL elements (for media items) by default. The decoupled approach allows EDL elements for media items to be somewhat separated from the track control elements (i.e. the EDL elements defining the track control attributes). As noted, the data structures associated with the track control attributes in the decoupled arrangement are referred to as track control elements. The decoupling need not be complete, as will be described in relation to FIG. 5, as some track control attributes remain in the EDL element for the media item. In the decoupled arrangement part of the association between EDL elements for media items and track control attributes is established by adjacency. EDL elements for media items and track control elements are intermixed in a list that is referred to as a modified EDL (to distinguish it from a "normal" EDL which does not contain track control data structures/elements). Track control attributes in this decoupled arrangement refer to the EDL element following them as depicted by 404 in FIG. 5 which associates the track control element 403 with the EDL element 301'.

Figure 5:
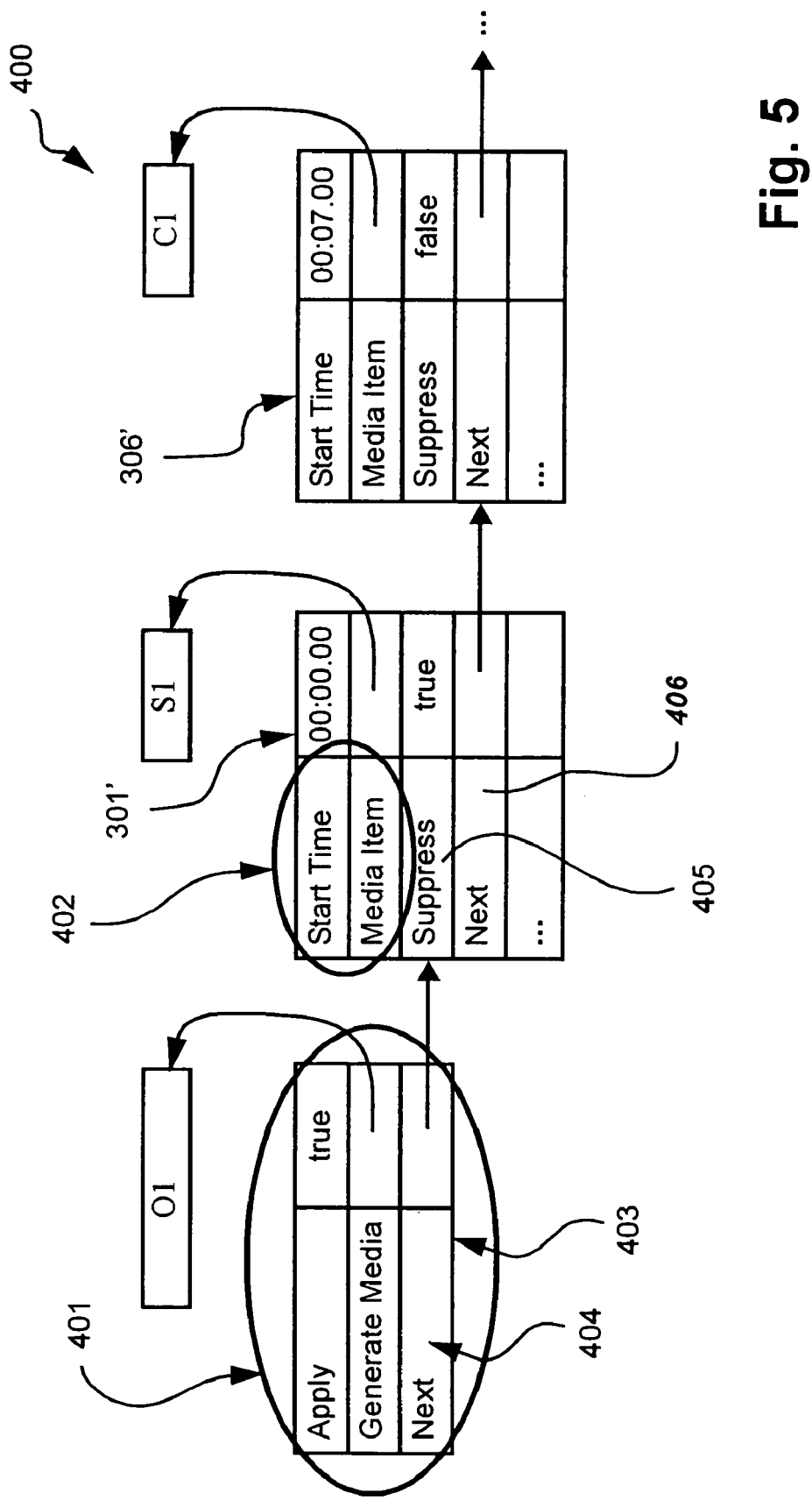
FIG. 5 shows an alternate data structure for EDL elements of the source track in question, the EDL elements containing the same media item information and track attributes as FIG. 4.

FIG. 5 shows, using the decoupled approach, EDL elements 301' and 306' that correspond to the EDL elements 301 and 306 respectively in FIG. 4. In the aggregated arrangement, track control attributes are present in each EDL element in the EDL. In order to render the track control attributes of a given EDL element in the aggregated arrangement inoperative, the Boolean variables Suppress and Apply are given values of FALSE, and the Generate Media variable is provided with a NULL reference (see for example the EDL element 306 and the field 308 in FIG. 4). In the decoupled arrangement, the track control attributes can simply be omitted as is the case with the EDL element 306'. Accordingly, in this decoupled representation, absent attributes are equivalent to NULL or FALSE control attributes in the aggregated arrangement in FIG. 4.

Having regard to the EDL element 301' in FIG. 5 it is evident that the track control attributes Apply and Generate Media have been removed and incorporated in a EDL element 403 that contains the track control attributes 401. In this decoupled representation, absent attributes (i.e. the absence of a track control element associated with the EDL element 306') are equivalent to null or false control attributes of FIG. 4 (as found, for example, in the EDL element 306). It is noted that the variable Suppress, (see 405 in FIG. 5) which is related to generation of dependent tracks, is still found in the EDL element 301'. It is equally possible, however, to move the variable to a distinct EDL element that applies to the subsequent EDL element. The value of the attribute Apply is shown explicitly, however it can equivalently be required that the containing EDL element not be present when Apply is FALSE, thereby allowing the value of this attribute to be implicitly defined by the presence or absence of the containing EDL element.

With this decoupled method a system, such as an editing arrangement incorporating the disclosed track generation technique, may more flexibly control how track control attributes and EDL elements are associated. It should be appreciated that the track control attributes and the association itself can be refactored in different ways without affecting the fundamental principles of the track generation technique. In other words, the decoupling of the track control attributes 401 from the media item attributes 402 can be performed in different ways without affecting the track generation technique.

Returning to FIG. 2, the EDL 902, which is associated with the source track 906, is processed by the software application running on the computer system 100 whenever it becomes necessary to update the dependent media item 911. This processing needs to be performed before the dependent media item 911 is previewed, either on its own or as part of a composite production. In an editor that enables preview of changes as soon as the changes are made, this source track processing is performed whenever the source track changes.

In order to generate the dependent media item 911, the EDL 902 is processed in clip display order as depicted by an arrow 915, in order to determine contiguous sequences of EDL elements which reference the same media, and thus define a range of the dependent generated media item 911. For every sequence of EDL elements generating a dependent media item, a portion of new dependent track, conforming to the duration and start time of the sequence of EDL elements, is generated using the media that is referenced by the relevant Generate Media attribute (see 710 in FIG. 8).

When track control attributes of an EDL element assign to the attribute Apply a value of TRUE, any previous media in use in the dependent track is replaced. Provided that the attributes of the EDL element does not specify that the generation should be skipped for this media item (i.e. Suppress=TRUE), generation of the dependent track using newly referenced media will commence from the start point of the current media item, otherwise the dependent track will begin from the start point of the first media item that permits overlaying (i.e. which permits generation of the dependent track). Generation of the dependent track will continue from that point on, being present for (i.e. synchronised with) all media items except those that have their Suppress attribute set to TRUE, until the generated media is either removed, replaced, or the end of the media item list (i.e. the EDL) for the source track is reached.

The length of generated media item in the dependent track is determined by the length of sequences in the EDL that permit generation. If the length of the media to be used for the dependent media item based on the Generate Media attribute does not conform to the duration of the source sequence it is being synchronised with, the dependent track is extended or shortened in duration. For example, if the dependent media item would be too long in duration, it may be trimmed. If the dependent media item would be too short, it will be repeated or looped to attain the required length, with the last instance being trimmed. It should be appreciated that these approaches are examples only, and there are other ways to extend or shorten media that can be used.

Figure 6A:
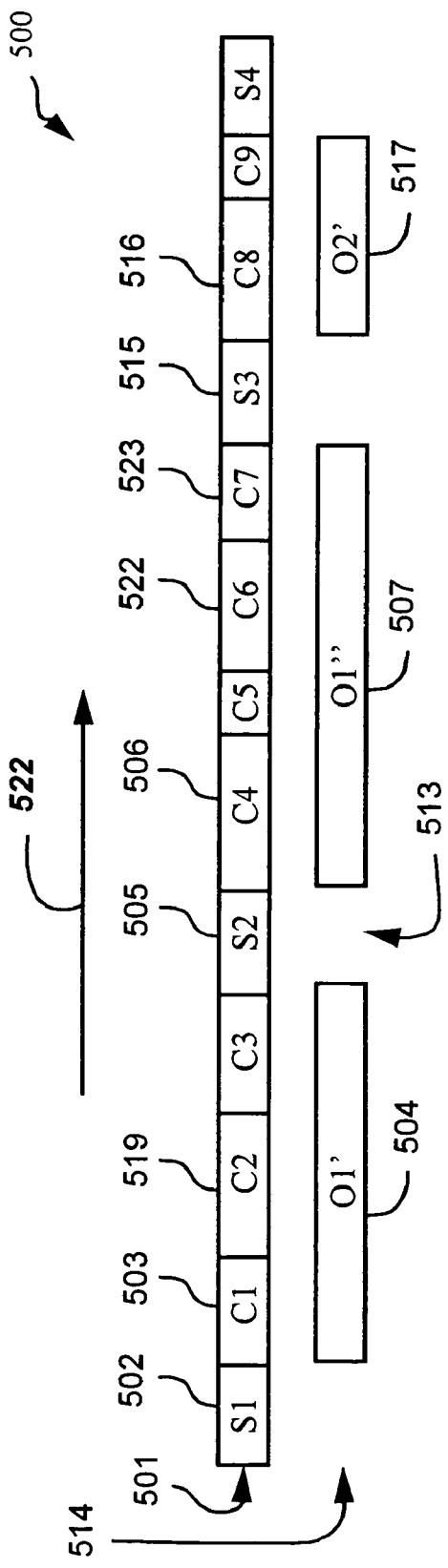
FIGS. 6A and 6B show visual representations of source tracks and associated dependent overlay tracks generated from the EDL of the source tracks.

FIG. 6A provides an example of generating a dependent track from a source track. A sequence of media items 502, 503, 519 . . . of varying durations is depicted in increasing time order, depicted by an arrow 522, thereby forming a source track 501. The EDL elements (not shown) for the media items in the track 501 have various track control attributes. The assigned values of these attributes are defined in FIG. 7. From a terminology perspective, "X" means TRUE in FIG. 7, and a blank entry means FALSE when considering the Suppress and Apply columns in FIG. 7. Thus, for example, a media item 502 (designated as S1 in the left hand column 601 of FIG. 7) has associated track control attribute values Suppress=TRUE, Apply=TRUE, and Media Generation=O1. Furthermore, a media item C1 in the column 601 of FIG. 7 has associated track control attribute values Suppress=FALSE, Apply=FALSE, and Media Generation=NULL.

Returning to FIG. 6A a dependent media item 514 is generated by track control attributes in the EDL elements associated with the source track 501. The dependent track 514 commences with a media item 504 with a designation "O1'" indicating that the media item O1' is generated using a base media item O1. The media item 504 (i.e. O1') may, however, be different in length from the base media item O1. It is noted that both the dependent media item O1' (i.e. 504) and a dependent media item 507 (designated as O1") are generated from the media item O1. A blank region 513 in the dependent track 514 indicates that no media item is generated in the noted area 513.

Figure 6B:
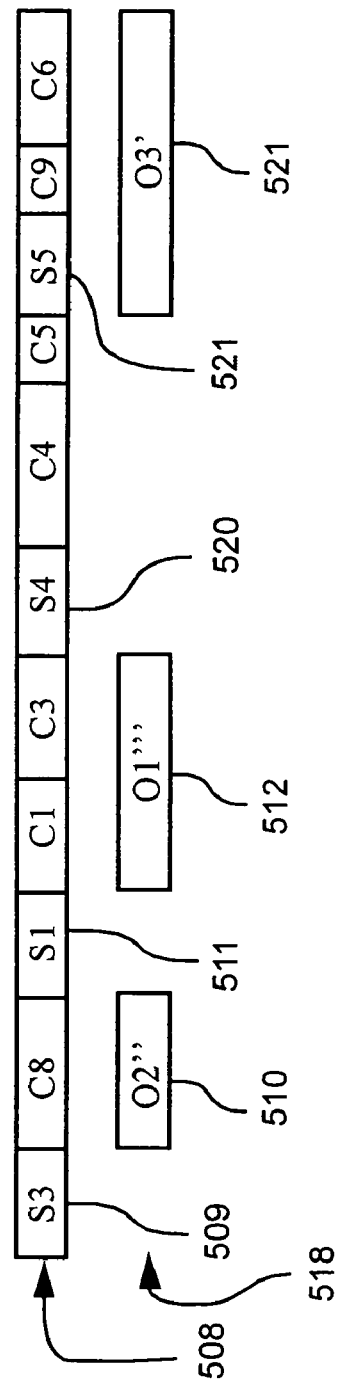

FIG. 6B shows an amended source track 508, which is the source track 501 after a number of changes have been made thereto. Some of the changes are set out as follows. (a) Media item 515 (i.e. S3 in the source track 501) and a media item 516 (i.e. C8 in the source track 501) have been moved to the start of the track 508. (b) A source media item 519 (i.e. C2 in the source track 501) has been deleted and thus does not appear in the amended source track 508. (c) The media item 505 (i.e. S2 in the source track 501) is replaced by a media item 520 (i.e. S4) in the source track 501). (d) An EDL for a media item 522 (i.e. C6 in the source track 501) is moved to the end of the EDL for the amended source track 508, and a media item 523 (i.e. C7 in the source track 501) is deleted. (e) A (new) media item 521 (i.e. S5 in the amended source track 508) is added. The final outcomes of the above manipulations are as follows. The dependent media item 517 is automatically regenerated, according to the disclosed track generation method, with the media item 515 (i.e. S3 in the source track 501) to form the dependent media item 510 (i.e. O2" in a dependent track 518 that is loosely synchronised with the altered source track 508). The duration of the dependent media item 510 is automatically adjusted according to corresponding track control attributes in the altered source track 508. A gap is caused in the dependent track 518 generated between the start of the media item 520 (i.e. S4) and the start of a media item 521 (i.e. S5 in the amended source track 508). A track of new material 521 (i.e. O3' in the dependent track 518) is generated. O3'" is generated between S1 and S4.

Figure 7:
FIG. 7 is a tabular representation of the attributes associated with FIGS. 6A and 6B.

Considering FIGS. 6A, 6B and 7, with respect to overlays it is noted that the attributes of S2 (refer to the fifth entry in the column 601 in FIG. 7) do not affect which overlays should be applied (since the attribute Generate Media=NULL) except that it does not permit itself to be overlaid (since the attribute Suppress=TRUE). S4 (i.e. the second last entry in the column 601 in FIG. 7) is in effect a null overlay, since it begins a region where overlays will not be applied.

It is noted that the regions of overlays in the dependent track can be adjusted by operating on S1, S3, and S4 alone. Each of S1, S2, S3, S4 act to define an end to regions that border on each other, by virtue that once an overlay is in effect it continues until overridden. Note also if C1, C2, C3 etc are deleted, copied or moved, the region of the respective overlay that encompasses them expands or contracts appropriately. Further note that this lack of explicit control allows the design decision of an author of automatic editing rules to continue to influence the results of the manual editing process.

FIG. 8 shows a track generation process 700 in flowchart form. The acronym EE is used in FIG. 8 to indicate the term "EDL element". The process 700 commences with a step 701 that sets a current EDL element index, to the element where processing is to begin, usually the first EDL element. Thereafter, a testing step 702 determines whether the index lies beyond the last EDL element. If this is the case, then the process 700 follows a "yes" arrow to a stop step 713. Otherwise, the process 700 follows a "no" arrow to a step 703 which determines if the current EDL element permits (continued) generation of a dependent EDL element. In other words, this step checks if the Suppress attribute is FALSE. If so, then the process 700 follows a "yes" arrow to a step 704 that defines the starting index for generating the dependent media item to be the index of the current EDL element. If not, then the process 700 follows a "no" arrow from the step 703 to a step 705 that defines the starting index for generating the dependent media item to be the index of the EDL element following the current EDL element.

The process 700 is directed, from both the steps 704 and the step 705, to a step 706 which sets the end index for the dependent media being generated to be the index of the next EDL element after the current element with (Apply=TRUE) OR (Suppress=TRUE). Thereafter, a step 707 determines whether the current EDL element has the attribute Apply=TRUE. If so, then the process 700 follows a "yes" arrow to a step 708 that saves the value of Generate Media. A following step 709 determines a media value previously saved by the step 708, on the present or a previous iteration and tests if there is at least one EDL element between the start and end indices (as determined in the steps 704, 705). Returning to the step 707, if Apply NOT=TRUE then the process 700 follows a "no" arrow to the step 709.

If the stated condition for the step 709 is met, then the process 700 follows a "yes" arrow to a step 710 that generates a dependent media item starting from the start time of the EDL element referenced by the start index previously calculated time and ending at the start time of the EDL element referenced by the end index previously calculated, into the dependent track. Thereafter, a step 711 advances the current EDL element item index to the next media item with attribute values (Apply=TRUE) OR (Suppress=TRUE). Returning to the step 709, if the condition is not met, then the process 700 follows a "no" arrow to the step 711. After the step 711, the process 700 follows an arrow 712 back to the step 702.

It should be noted that the nature of the media referenced by the variable Generate Media determines the details of the generation. In complex cases the media can contain attributes or processing instructions that dictate how this media should produce dependent media of any given duration. For example, the variable Generate Media may itself have some structure that is to be reflected in media that is generated from the variable. In one example, media generated according to the variable Generate Media begin from the beginning, incorporating as much media as is required. If, however, more media is required than is available, the first five seconds of the available media is not repeated, however the remainder of the media is repeated as necessary to generate media of whatever length is required.

Some variation on the previous process is possible. One variation relates to the aspect of media having continuity, i.e. media having some dependence on ordering. The implementation of the media generation step 710 considers, in this variation, the treatment of continuity when generation is suppressed by EDL elements where the variable Suppress is TRUE. If continuity is not a concern, then media copying can always begin from the start of the media referenced by Generate Media. Otherwise, media copying begins where media generation ended previously. According to another alternative, account is taken of the time period during which media generation was suppressed due to the Suppress attributes being set to TRUE, and start media generation after taking into account the time period of the 'suppression'. This is particularly important if the media being used as a template has some repetitive feature or rhythm, or some other time dependence, that should continue to operate during the period of suppression of the media, in order to preserve the required artistic affect. The aforementioned variation addresses this issue.

It is further noted that the process 700 interleaves some of the processing for the Apply and Suppress attributes. For some arrangement this may be advantageous or necessary for reasons of internal architecture. However, in other arrangements, preservation of continuity may be more simply achieved, by ignoring the Suppress attributes (i.e. treating the attribute as if it is set to FALSE) during the processing steps where they are considered (703, 706, 711), with the exception of step 710. This approach will result in different 'Start' and 'Stop' indices being passed to the step 710. The step 710 can, in this case, generate media in the same manner described in relation to FIG. 8, however the step 710 should in this instance remove sections of media that correspond to sections where the Suppress attribute is set to FALSE. This can be done as a post-processing step by replacing generated media during the calculated times with blank media i.e. media with no effect. Furthermore, instead of omitting media when the Suppress attribute is set to FALSE, alternative media generation may be used, e.g. a characteristics of the media may be changed, for example colour or volume or different media substituted.

Another arrangement varies the processing of steps 706 and 707. If any Apply attribute encountered during the processing steps specifies the same media as the current media, i.e. the specified media is identical to the current media, the specified media can be ignored thus avoiding interruption to some time dependent feature.

A Graphical User Interface (GUI) that is applicable to the track generation method in some cases is now described. The extent to which the GUI needs to provide user interaction with the track control attributes varies with the editing system in which the track generation technique is incorporated. In some editors, there is little or no need for a GUI in regard to track control attributes. Thus, for example, in an editor that provides automatic editing facilities, the track control attributes can be set when automatic editing is applied, and the user need be given no further control over these attributes. In such a case, the automatic editing process can set the track control attributes as it considers appropriate.

For example, considering the source track 501 in FIG. 6A, the auto-editor may automatically insert the clips S1, S2, S3, S4 and set the relevant track control attributes to use media O1, O2 which are video overlays. If the user moves, copies, or deletes the clips S1, S3, S4, overlays will be similarly moved, copied or deleted according to the disclosed track generation method. As the clips C1, C2, . . . Cn are moved the overlays that apply will be dependent upon where the clips C1, C2, . . . Cn are positioned relative to S1, S3, S4. As the clips C1, C2, . . . Cn are deleted or duplicated, the overlay associated with the clips C1, C2, . . . Cn will be shortened or lengthened.

If desired, default track overlay media can also be defined to allow an overlay to be commenced before an EDL element applying an overlay is encountered. This allows a user to concentrate on the main editing task without needing to consider the overlay track synchronisation. This additional functionality can be provided in the context of existing Graphical User Interfaces (GUIs), and obviates the need for a complex GUI to maintain synchronisation arrangements.

If the provided GUI allows track control attributes to be set by the user, then the user need not explicitly define the beginning and end of a region to which an overlay is to be applied. The disclosed method maintains an overlay once the overlay is activated, until track control attributes are encountered that alter or end the overlay, or alternately, until the end of source media is encountered. Additionally, individual media items may be set to have overlays suppressed for their duration.

If no track control attributes are set in order to thereby disable an overlay before the end of media, additional media added at the end of media will have the overlay extended to cover them.

Ease of use is increased over systems that require precise definition of regions where an overlay is to apply is achieved.

Figure 9:
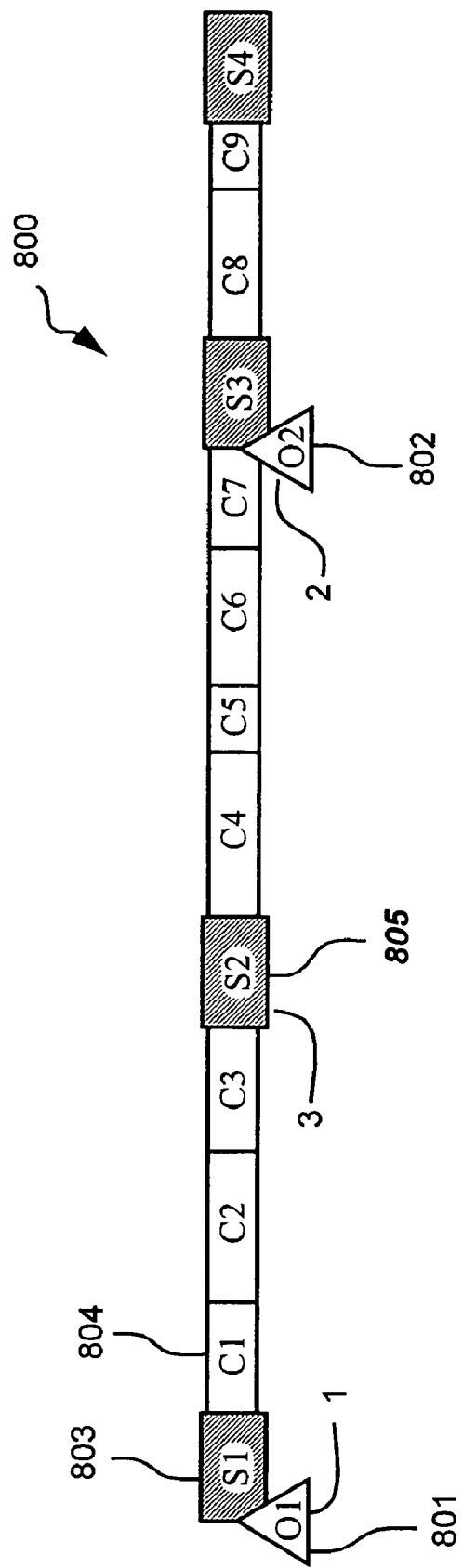
FIG. 9 shows an example of a Graphical User Interface (GUI) allowing user interaction to the automatic track generation method.

FIG. 9 shows an example 800 of a GUI for a manual editing arrangements, in which the user may interact with the track control attributes. Implementation of this GUI is particularly simple if the decoupled EDL arrangement depicted in FIG. 5 is used, however the GUI can be used with the aggregated EDL arrangement as well.

The GUI 800 provides representations 801, 802 of track control attributes on the same display where it depicts a story-board or timeline made up of media items 803, 804 . . . . The position of overlays can be adjusted by moving the indicators, 801, 802. An indication that dependent tracks are suppressed is also made available by modifying the appearance of those clips where overlays are suppressed, as shown in the shading of the GUI element 805. In this arrangement, a user can reposition dependent tracks simply by altering the position of the indicators 801, 802 such as by dragging them with a mouse to a new position. The user can also decide where to position media items based on the position of the track control indicators 801, 802, and therefore determine which dependent track is to apply to which media item. The user can also control the Suppress attribute in clips. In addition the GUI provides additional means to create and destroy additional overlays, which will result in the appearance and disappearance of the track control indicators.

INDUSTRIAL APPLICABILITY

It is apparent from the above that the arrangements described are applicable to the data processing industries.

The foregoing describes only some embodiments of the present invention, and modifications and/or changes can be made thereto without departing from the scope and spirit of the invention, the embodiments being illustrative and not restrictive.

The claims defining the invention are as follows:

1. A method of generating a first media track, the first media track comprising a sequence of media items selected from a first group of media items, said method comprising the steps of:

adding an Edit Decision List (EDL) element into a second media track, the EDL element referencing a media item from the first group of media items, wherein the EDL element is a data structure comprising an element that selects at least a portion of the referenced media item from the first group of media items, and a transformation to be applied to the selected portion of the referenced media item;

associating at least one track control attribute in the EDL element with at least one subsequent EDL element in the second media track, the track control attribute changing a duration of a media item in the first media track referenced by the EDL element in the second media track, wherein the track control attribute includes an attribute that serves to change commencement and termination of the media item in the first media track referenced by the EDL element in the second media track;

generating the first media track in accordance with the EDL element, the at least one track control attribute, and another media item in a third media track; and upon a sequence of EDL elements being modified, wherein the EDL element having the track control attribute is moved to a new position in the modified sequence: (a) rearranging the media items in the first media track in accordance with the modified sequence of the EDL elements; and (b) associating the track control attribute with at least one subsequent EDL element in the modified sequence, the track control attribute affecting a duration of a media item in the first media track referenced by the EDL element in the modified sequence, the duration of the media item in the first media track being based on a duration of the another media item in the third media track, wherein the method is carried out by an apparatus comprising a memory.

2. A method according to claim 1, wherein the re-arranging step comprises deletion of the EDL element.

3. A method according to claim 1, wherein the first media track is started in accordance with a track control attribute associated with an EDL element in the sequence of the EDL elements.

4. A method according to claim 1, wherein the first media track is terminated in accordance with a track control attribute associated with an EDL element in the sequence of the EDL elements.

5. A method according to claim 1, wherein the first media track is a graphical overlay that is referenced by a track control attribute.

6. A method according to claim 1, wherein the media item in the first media track comprises a copy of a source media item in a source media track, which is referenced by an EDL element in the sequence of the EDL elements.

7. A method according to claim 6, wherein the copy of the source media item forms the media item in the first media track.

8. A method according to claim 1, wherein the track control attribute comprises one of (a) an attribute to activate a media item in the first media track and (b) an attribute to deactivate the media item in the first media track.

9. An apparatus for generating a first media track, the first media track comprising a sequence of media items selected from a first group of media items, said apparatus comprising:

a hardware memory;

an editor for adding an Edit Decision List (EDL) element into a second media track, the EDL element referencing a media item from the first group of media items, wherein the EDL element is a data structure comprising an element that selects at least a portion of the referenced media item from the first group of media items, and a transformation to be applied to the selected portion of the referenced media item;

means for associating at least one track control attribute in the EDL element with at least one subsequent EDL element in the second media track, the track control attribute changing a duration of a media item in the first media track referenced by the EDL element in the second media track, wherein the track control attribute includes an attribute that serves to change commencement and termination of the media item in the first media track referenced by the EDL element in the second media track; and means for generating the first media in track in accordance with the EDL element, the track control attribute, and another media item in a third media track; and means for, upon a sequence of EDL elements being modified, wherein the EDL element having the track control attribute is moved to a new position in the modified sequence: (a) rearranging the media items in the first media track in accordance with the modified sequence of the EDL elements; and (b) associating the track control attribute with at least one subsequent EDL element in the modified sequence, the track control attribute affecting a duration of a media item in the first media track referenced by the subsequent EDL element in the modified sequence, the duration of the media item in the first media track being based on a duration of the another media item in the third media track.

10. A non-transitory computer readable disk or non-transitory storage device having recorded thereon a set of computer program modules comprising computer program code for directing a processor to execute a method for generating a first media track, the first media track comprising a sequence of media items selected from a first group of media items, said method comprising the steps of:

adding an Edit Decision List (EDL) element into a second media track, the EDL element referencing at least one media item from the first group of media items, wherein the EDL element is a data structure comprising an element that selects at least a portion of the referenced media item from the first group of media items, and a transformation to be applied to the selected portion of the referenced media item;

associating at least one track control attribute in the EDL element with at least one subsequent EDL element in the second media track, the track control attribute changing a duration of a media item in the first media track referenced by the EDL element in the second media track, wherein the track control attribute includes an attribute that serves to change commencement and termination of the media item in the first media track referenced by the EDL element in the second media track;

generating the first media track in accordance with the EDL element, the track control attribute, and another media item in a third media track; and upon a sequence of EDL elements being modified, wherein the EDL element having the track control attribute is moved to a new position in the modified sequence: (a) rearranging the media items in the first media track in accordance with the modified sequence of the EDL elements; and (b) associating the track control attribute with at least one subsequent EDL element in the modified sequence, the track control attribute affecting a duration of a media item in the first media track referenced by the subsequent EDL element in the modified sequence, the duration of the media item in the first media track being based on a duration of the another media item in the third media track.

11. A non-transitory memory storing a media production comprising a first media track, the first media track comprising a sequence of media items selected from a first group of media items, the media track being formed by a method comprising the steps of:

adding an Edit Decision List (EDL) element into a second media track, the EDL element referencing at least one media item from the first group of media items, wherein the EDL element is a data structure comprising an element that selects at least a portion of the referenced media item from the first group of media items, and a transformation to be applied to the selected portion of the referenced media item;

associating at least one track control attribute in the EDL element with at least one subsequent EDL element in the second media track, the track control attribute changing a duration of a media item in the first media track referenced by the EDL element in the second media track, wherein the track control attribute includes an attribute that serves to change commencement and termination of the media item in the first media track referenced by the EDL element in the second media track;

generating the first media track in accordance with the EDL element, the track control attribute, and another media item in a third media track; and upon a sequence of EDL elements being modified, wherein the EDL element having the track control attribute is moved to a new position in the modified sequence: (a) rearranging the media items in the first media track in accordance with the modified sequence of the EDL elements; and (b) associating the track control attribute with at least one subsequent EDL element in the modified sequence, the track control attribute affecting a duration of a media item in the first media track referenced by the subsequent EDL element in the modified sequence, the duration of the media item in the first media track being based on a duration of the another media item in the first media track.

* * * * *